April 5, 1949.  W. T. NARDIN  2,466,263
GASKET

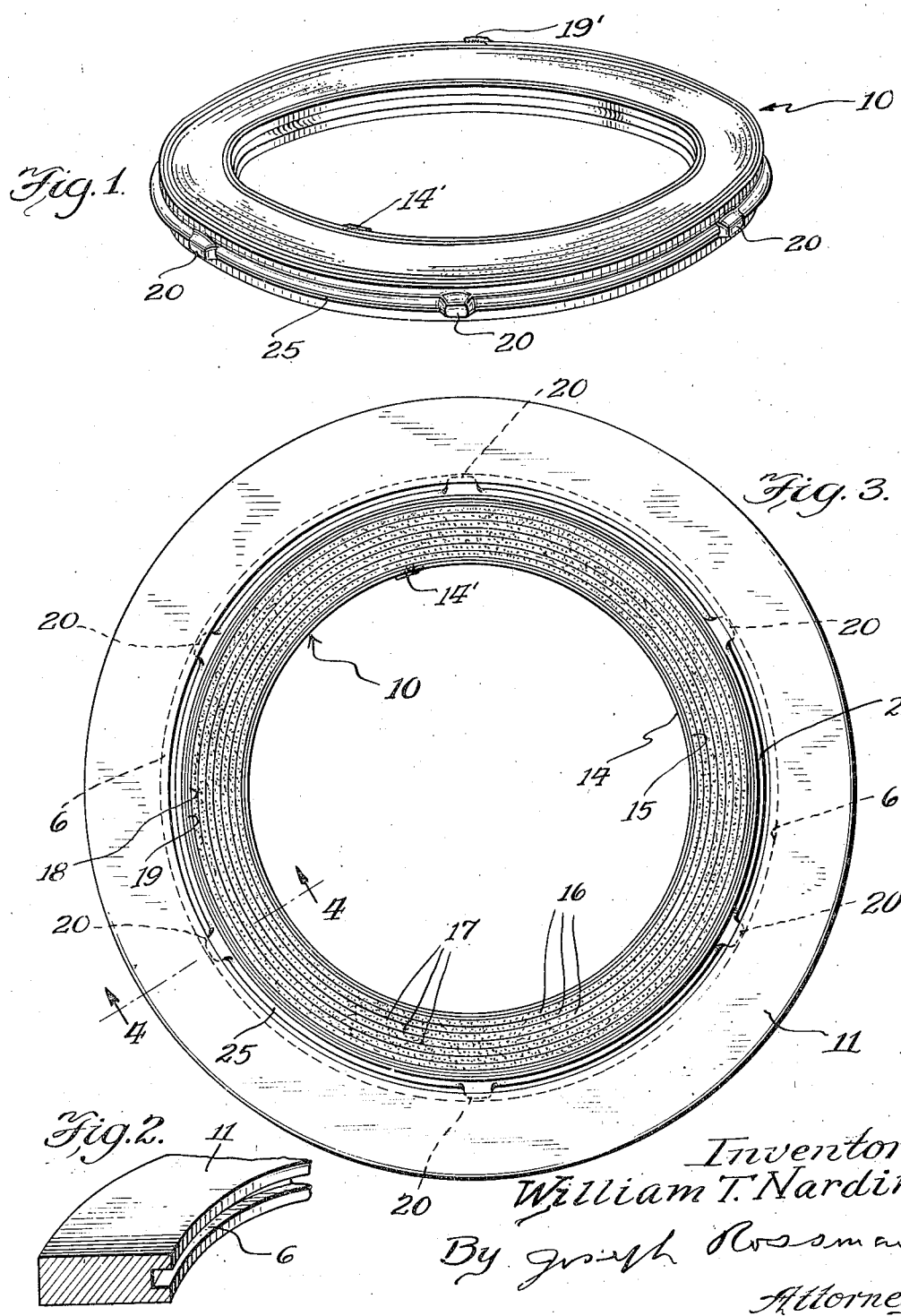

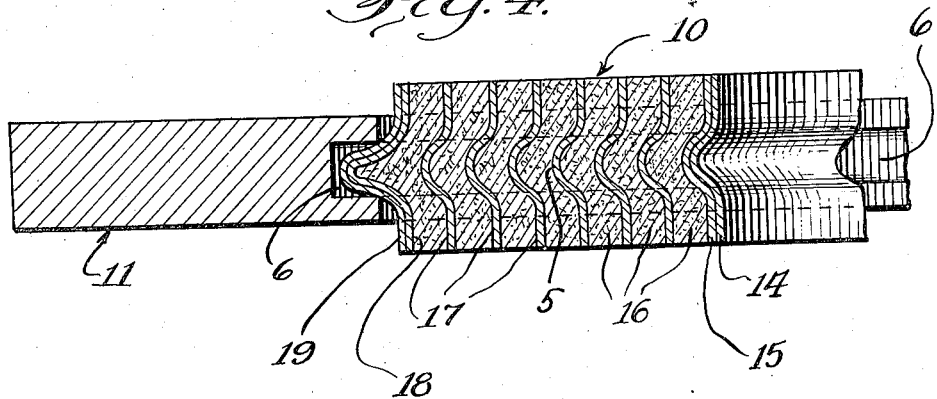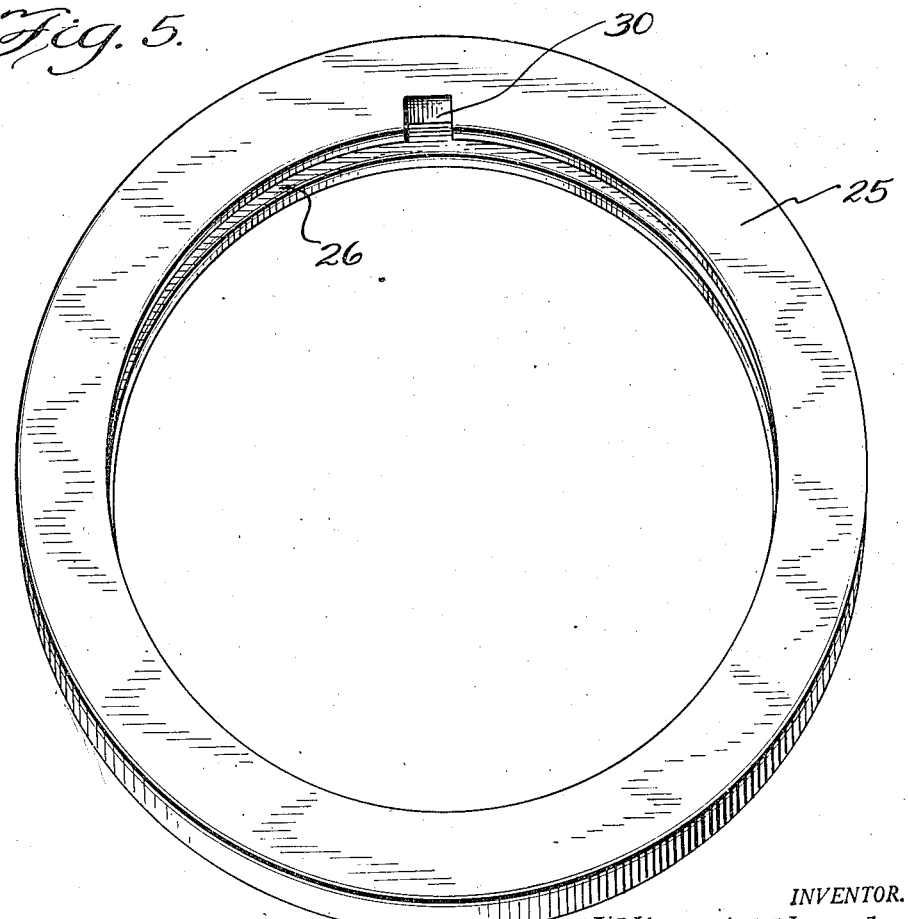

Filed Oct. 19, 1944  4 Sheets-Sheet 3

Inventor
William T. Nardin
By Joseph Rosaman
Attorney

April 5, 1949.   W. T. NARDIN   2,466,263
GASKET
Filed Oct. 19, 1944   4 Sheets-Sheet 4
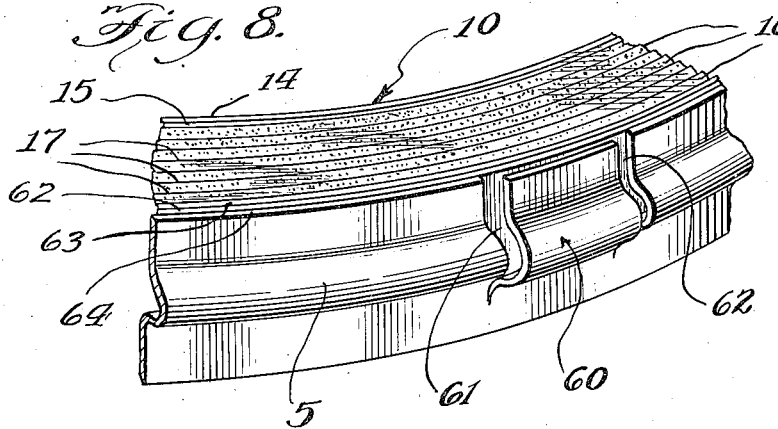
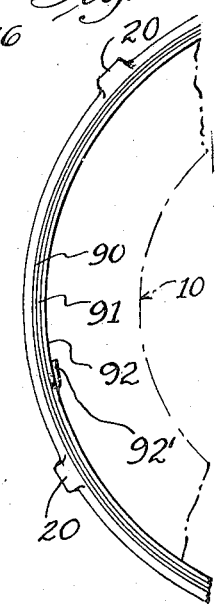
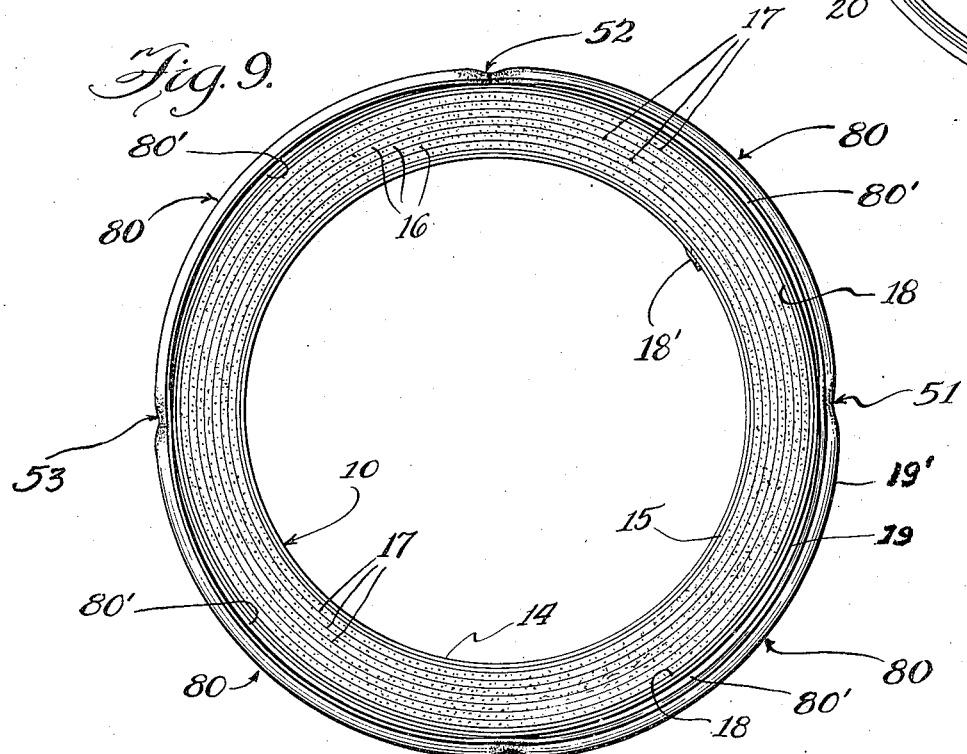
INVENTOR.
William T. Nardin
BY
Joseph Rossman
ATTORNEY Patented Apr. 5, 1949

2,466,263

UNITED STATES PATENT OFFICE 2,466,263

GASKET

William T. Nardin, Moorestown, N. J., assignor to United States Gasket Company, Camden, N. J., a corporation of New Jersey Application October 19, 1944, Serial No. 559,456

1 Claim. (Cl. 288—27)

This invention relates to gasket constructions. More specifically, the invention relates to gaskets constructed of a spirally wound metal strip having non-metallic packing or tape interposed between the coils, the outer periphery of the gasket being provided with means for interengagement with a gasket centering means.

For the purpose of illustrating the invention, there is shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Figure 6:
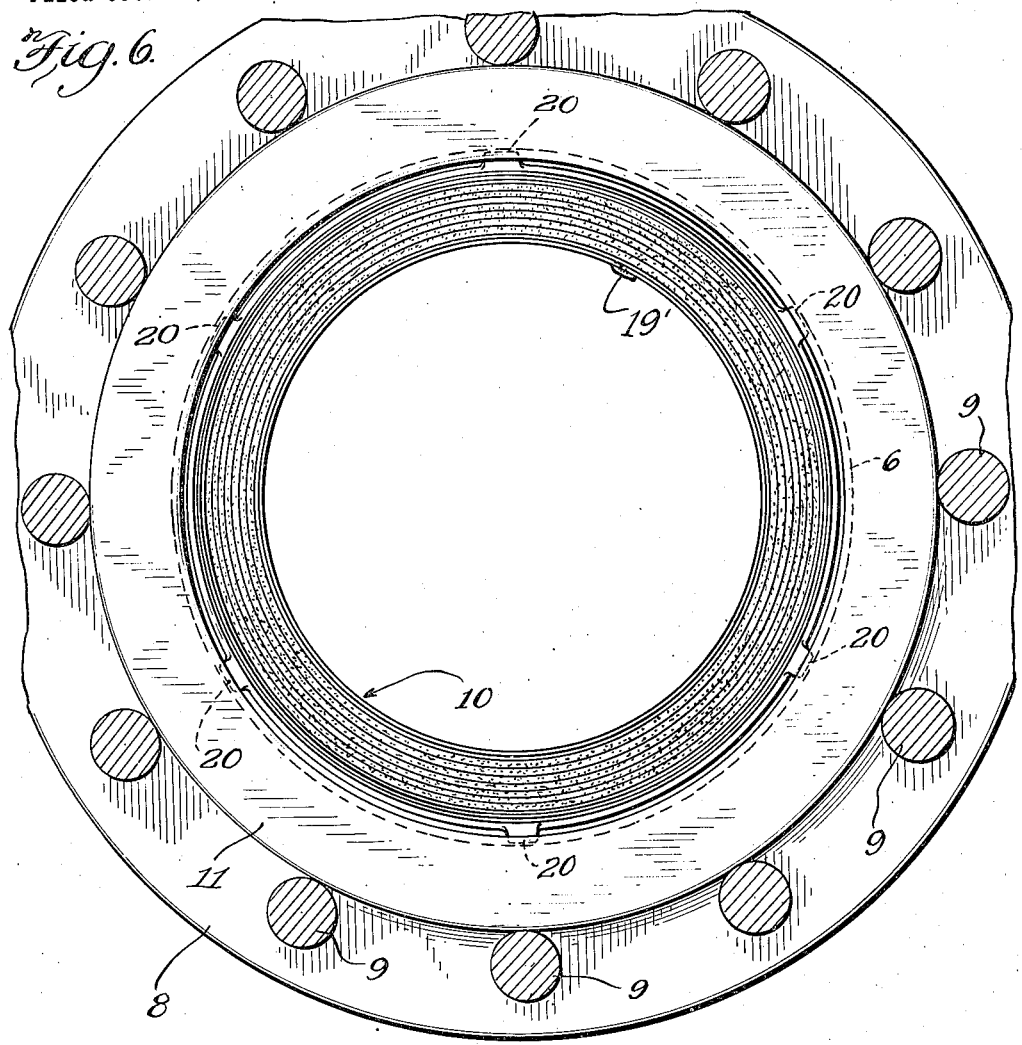
Figure 7:
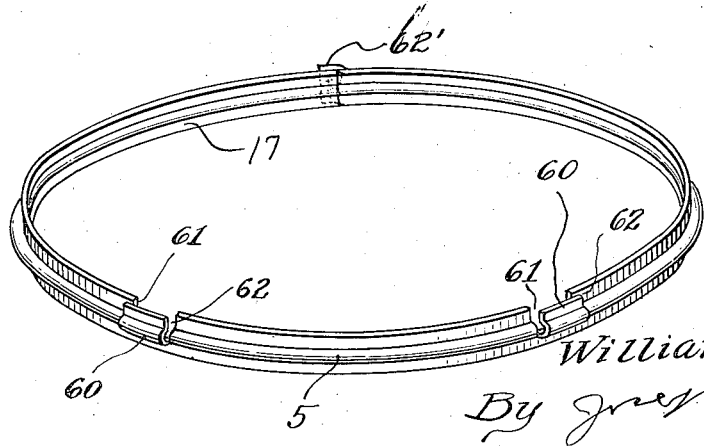

Figure 1 is a perspective view of a gasket construction embodying the novel features of my invention, Figure 2 is a fragmental perspective view of a centering ring for receiving the gasket illustrated in Figure 1, Figure 3 is a plan view of the gasket shown in Figure 1 and the centering ring shown in Figure 2 in assembled relation, Figure 4 is an enlarged sectional view taken on lines 4—4 of Figure 3, Figure 5 is a perspective view of a modified centering ring construction adapted for receiving and retaining the gasket illustrated in Figure 1, Figure 6 is a plan view, partly in section, illustrating the assembled gasket and centering ring in position between mating flanges of two pipe sections, Figure 7 is a perspective view of a ring construction adapted to be positioned about the outer periphery of a standard gasket, Figure 8 is an enlarged fragmental perspective view of a modified construction of my gasket, Figure 9 is a plan view of another modified construction of my gasket, and Figure 10 is a fragmental plan view of a ring construction adapted to be positioned about the outer periphery of a standard gasket.

Referring more particularly to the drawings, one embodiment of the invention is illustrated in Figure 1, wherein the completed annular gasket 10 is formed of a spirally wound or convolutely wound metal strip 17 and asbestos strip or other suitable non-metallic packing strip 16 interposed between the metal coils, except that preferably no non-metallic packing is interposed between the two innermost windings or convolutions 14 and 15 and the last two outermost convolutions 18 and 19. The free ends 14¹ of the metal strip are preferably spot welded to the metal strip convolution therebeneath both at the outer and inner periphery of the gasket to prevent unwinding of the strip. If desired three or more convolutions may be provided in metal contact with each other without any packing therebetween when it is desired to reinforce the gasket either at the inner or outer periphery.

The metal strip 17 utilized for making the gasket is preferably made of relatively thin steel ribbon which is provided with a medially positioned continuous longitudinally extending bead or rib portion. When the metal strip is wound in face to face contact at the inner and outer periphery of the gasket the rib or bead portions are interlocked or interengaged as illustrated in Figure 4.

In forming the gasket, a metal strip 17 of suitable length is secured and wound on a mandrel of suitable diameter so that two full convolutions are wound up in face to face contact with each other. The end of asbestos or other non-metallic packing 16 of suitable length and thickness is then applied and interposed between the succeeding metal tape convolutions, the two outermost convolutions 18 and 19 having no packing therebetween, and being in face to face contact. The outer periphery of the gasket so formed is then provided with a series of spaced protuberances or tongue portions 20 which are formed by crimping or deforming selected portions of the outer metal convolutions 18 and 19 of the gasket. These protuberances are adapted to interfit with and frictionally engage a continuous annular channel or slot 6 provided in the inner face of a gauge or centering ring 11 within which the gasket is adapted to be positioned in assembled relation as illustrated in Figures 3 and 4. The assembled centering ring and gasket are adapted to be positioned between the flanges 8 of two adjacent pipe sections as illustrated in Figure 6, the outer periphery of the centering ring 11 contacting the bolts 9.

The invention is not restricted to any particular size or shape of the protuberances except that they are formed of such contour as to readily interfit with and frictionally engage complemental retaining and embracing wall portions of the annular slot or channel 6 of the centering ring. The inner diameter of the centering ring 11 is preferably slightly larger than the outer diameter of the gasket 10 so that when they are assembled the tongues 20 will slip or snap into the groove 6 and can freely slide along the groove. The gasket being slightly resilient transversely of its flat faces also facilitates tongues 20 to readily snap into the groove 6.

An important advantage of the tongue portions 20 is that they serve to compensate for any slight variations in the overall diameter of the gasket which may occur during their manufacture as it is difficult to control the final dimension within very narrow limits owing to variations in the compressibility of the packing tape used and also the springiness and resistance of the metal ribbon during the winding operation. Such slight variations in standard gasket constructions have hitherto been very troublesome when they are to be used with standard size machined centering rings as the gaskets would not fit and could not be assembled for positioning between pipe flanges. Such difficulty is overcome by my invention as the tongues or protuberances provided at the outer periphery of the gasket compensate for the variations of the gasket's outer diameter and permit retention of the gasket within the centering ring.

The invention is not restricted to the use of a specific number of protuberances as obviously any suitable number can be utilized. If desired even a single protuberance or a pair of opposed protuberances may be used. In such case a centering ring having the construction shown in Figure 5 may be utilized which is provided with a continuous annular groove or channel 26 at its inner periphery and a slot 30 at one of its flat faces adjacent the inner periphery and communicating with the channel. The slot is adapted to receive the tongue portion of a gasket and thus facilitates insertion of the tongue within the annular groove 26, particularly when the outer gasket diameter is approximately equal to the inner diameter of the centering ring.

The protuberances at the outer periphery of the gasket may obviously be made in many different forms. For example, in Figure 8 I may provide a gasket made of a plurality of metal convolutions 17 and interposed asbestos packing 16. The three outer convolutions 62, 63 and 64 have no asbestos therebetween. The outer convolution is slit or cut transversely at 61 and 62 starting at one face of the gasket and extending just past the bead portion 5. The portion 60 is then bent outwardly slightly away from the gasket so as to form an outwardly extending resilient spring member. A plurality of such resilient tongue members may be provided at spaced intervals at the outer periphery of the gasket which are adapted to resiliently engage the inner periphery of a centering ring having an annular channel at its inner periphery as shown in Figure 3. If desired the two outer metal convolutions may be slit along lines 61 and 62 to provide a two-ply resilient member when less springiness is required.

Another modification of my invention is illustrated in Figure 9, wherein the gasket is constructed of a plurality of convolutions of a metal strip 17 having the same cross-sectional contour as shown in Figure 4 and having asbestos tape 16 interposed therebetween. The inner end $18^1$ of the metal strip is spot welded to the convolution therebeneath and the outer end 52 is likewise spot welded to prevent unwinding of the metal strip. The three outer convolutions 18, 19 and $19^1$ have no asbestos interposed therebetween. The convolutions 18 and 19 are wound so as to have their bead portions 5 in interlocked relation throughout the entire periphery of the gasket. The outer convolution $19^1$, however, does not have its bead portion in engagement with the entire periphery of the convolution therebeneath but is spot welded at spaced intervals 50, 51, 52 and 53, the portions 80 between the spot welds being free and slightly spaced away as indicated by numeral $80^1$, thus providing a series of spring loops 80 about the periphery of the gasket. These loops are adapted to be received and retained within the annular channel of a centering ring having the construction illustrated in Figures 2 and 3.

Standard gasket constructions may also be provided with protuberances at their periphery by positioning an auxiliary outer ring about the periphery of the gasket. It may be particularly desirable to utilize such auxiliary outer rings in the event the gasket is under size and will not fit in a centering ring. An auxiliary outer ring is illustrated in Figure 7 which is constructed of a metal strip 17 which is similar to that used for making the gasket shown in Figure 4 and having a bead portion 5. The overlapped end of the strip is spot welded at $62^1$. The ring is cut at 61 and 62 to provide a plurality of spaced spring members 60 similar to those illustrated in the gasket shown in Figure 8. This auxiliary ring can be readily positioned about the outer periphery of a conventional gasket. The assembled auxiliary ring and gasket can then be positioned within a centering ring.

Another auxiliary ring construction is illustrated in Figure 10 which is made of a plurality of convolutions 90, 91 and 92 of a metal strip, the ends of the strip being spot welded as at $92^1$, to form a ring. A plurality of spaced protuberances 20 are provided at the outer periphery of the ring similar to those illustrated in the gasket shown in Figure 1. The auxiliary ring can be positioned about the outer periphery of a standard gasket 10 and can then be inserted in a suitable centering ring.

The term "protuberance" as used in the appended claims is intended to include means provided at the outer periphery of a gasket such as the tongue portions 20 illustrated in Figure 1, the springy loops 80 shown in Figure 9, or any other equivalent means for accomplishing the same purpose, whether integral with the gasket or provided by means of auxiliary rings as illustrated in Figures 7 and 10, or by fastening separate protuberances to the periphery of a conventional gasket in any suitable manner.

The present invention may be embodied in other specific forms without departing from the spirit or essential attributes thereof, and it is therefore desired that the present embodiments be considered in all respects as illustrative and not restrictive, reference being had to the appended claim rather than to the foregoing description to indicate the scope of the invention.

I claim:

A gasket comprising a convolutely wound metal strip having a continuous medially disposed rib portion, a non-metallic packing strip interposed between the convolutions of said metal strip intermediate the innermost and outermost convolution, the two innermost and outermost metal strip convolutions having no non-metallic tape therebetween and interlocked at their rib portions, the ends of said metal strip being spot welded to the adjacent convolution therebeneath, the outermost metal strip convolution being spot welded at spaced intervals to the next adjacent metal strip convolution therebeneath and radially spaced from said last-mentioned convolution intermediate the spot welded portions so as to provide a series of spring loops extending around the periphery of the gasket, said loops being adapted to be received and retained by coacting engaging elements of a centering ring.

WILLIAM T. NARDIN.

REFERENCES CITED

The following references are of record in the file of this patent:

UNITED STATES PATENTS

| Number | Name | Date |
| --- | --- | --- |
| 2,027,299 | Bohmer | Jan. 7, 1936 |
| 2,200,212 | Bohmer | May 7, 1940 |
| 2,244,640 | Davis | June 3, 1941 |
| 2,339,479 | McCreary | Jan. 18, 1944 |

FOREIGN PATENTS

| Number | Country | Date |
| --- | --- | --- |
| 686,556 | Germany | 1940 |